March 18, 1930.  A. F. STUART  1,750,733
ROTARY VALVE MECHANISM FOR INTERNAL COMBUSTION ENGINES
Filed Dec. 1, 1927  4 Sheets-Sheet 1

Inventor:
ALBERT F. STUART,
By Henry L. Chenery.
Attorney.

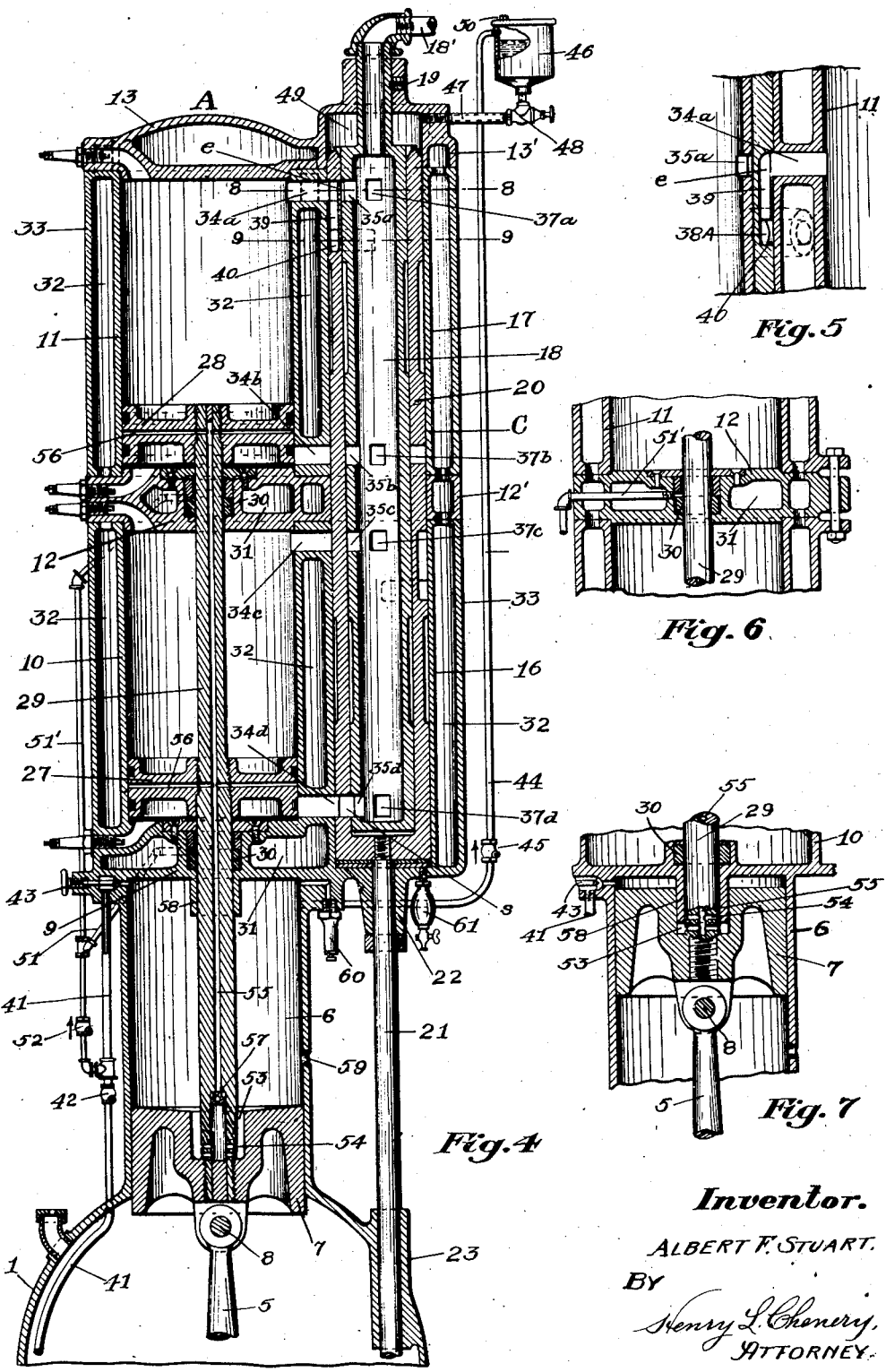

March 18, 1930. A. F. STUART 1,750,733
ROTARY VALVE MECHANISM FOR INTERNAL COMBUSTION ENGINES
Filed Dec. 1, 1927 4 Sheets-Sheet 3
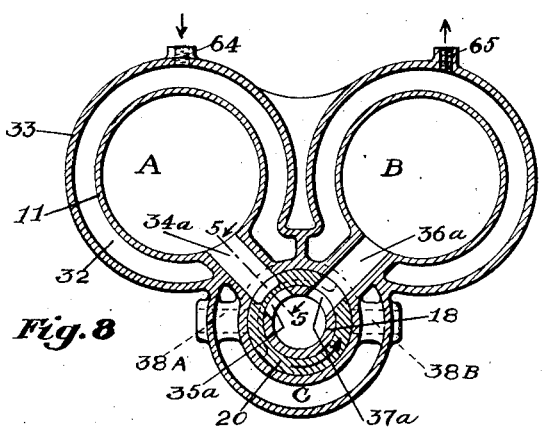
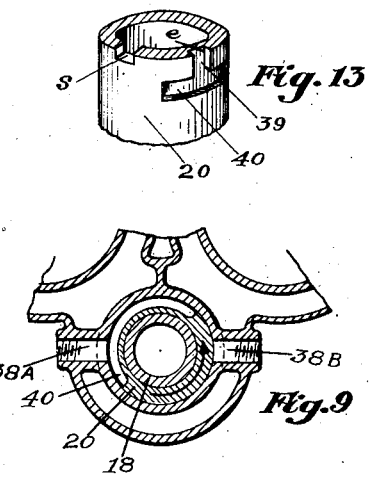
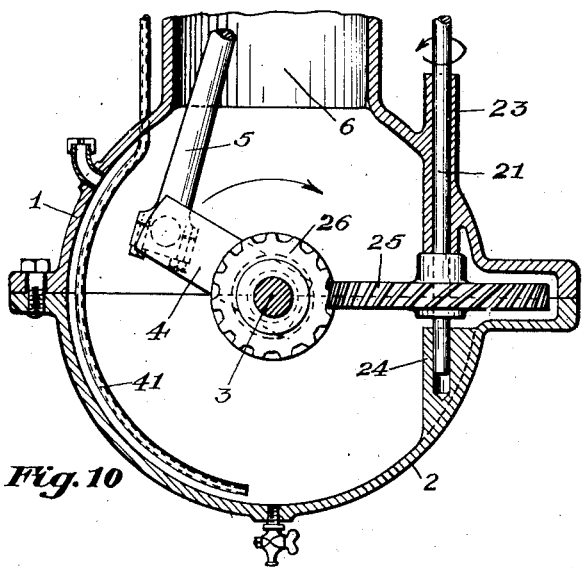
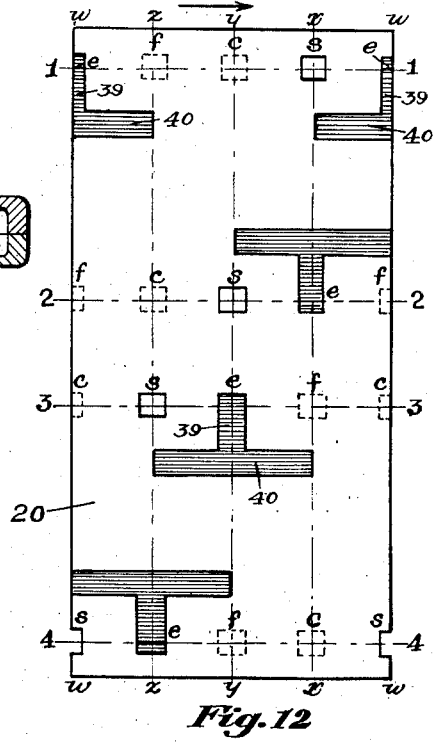
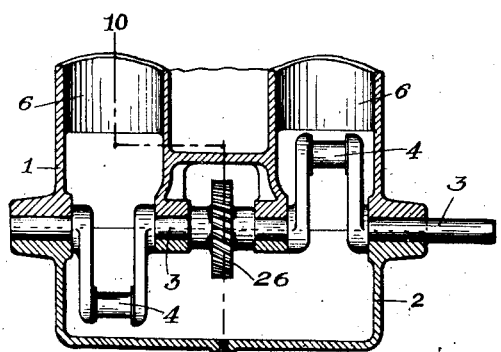
Inventor:
ALBERT. F. STUART,
By
Henry L. Chenery,
ATTORNEY.

Inventor:
ALBERT F. STUART
By
Henry L. Chenery,
ATTORNEY.

Patented Mar. 18, 1930

1,750,733

UNITED STATES PATENT OFFICE

ALBERT F. STUART, OF PORTLAND, MAINE

ROTARY VALVE MECHANISM FOR INTERNAL-COMBUSTION ENGINES

Application filed December 1, 1927. Serial No. 237,006.

My invention relates, in general terms, to internal combustion engines. The novelty and chief characteristic of the invention consists in the employment of a single revoluble valve structure designed to operate in connection with a plurality of cylinders each having but one port.

A particular object sought is to economize in the matter of cylinder space, and to this end I make the cylinders double acting, by which I mean that an explosion chamber is provided at each end, the pistons receiving the impact of the explosion on each side alternately.

Another object is the arrangement of the ports and passages in the valve whereby the admission of new and the discharge of burned gases to and from the cylinders is effected by the use of but one port in each cylinder.

A further object resides in the provisions made for lubricating the moving parts of the engine automatically, and the regulatory means supplied to deliver the proper quantity of lubricant to the several parts as each may require.

And a still further object concerns the compact construction possible by the use of double-acting pistons in conjunction with my unitary valve structure which serves simultaneously two cylinder block units operative on two separated points on the valve circumference.

Other objects will be apparent from reading the description hereinafter found in the specification, and in the accompanying drawings wherein is disclosed one embodiment of my invention which, at the present time, I consider preferable to other possible forms thereof,—

Fig. 4 is a fragmentary, sectional elevation of the engine, taken on line 4—4, Fig. 1;

Fig. 5 is a fragmentary, sectional elevation taken on line 5—5, Fig. 8;

Fig. 6 is a fragmentary, sectional elevation taken on line 6—6, Fig. 1;

Fig. 7 is a fragmentary, sectional elevation showing the cross-head in "up" position;

Fig. 8 is a sectional plan taken on line 8—8, Fig. 4;

Fig. 9 is a sectional plan taken on line 9—9, Fig. 4;

Fig. 10 is a fragmentary, sectional elevation of the crank-case, and the view completes the vertical section through the engine partially shown in Fig. 4,—the gears being shown in full;

Fig. 11 is a longitudinal, vertical section through the crank-case showing the crankshaft and gear for rotating the valve;

Fig. 12 is a diagram showing the circular surface of the valve developed into a flat plane surface;

Fig. 13 is a fragmentary perspective view of the sleeve valve, and

Similar reference characters indicate like parts in all views.

Figure 1:
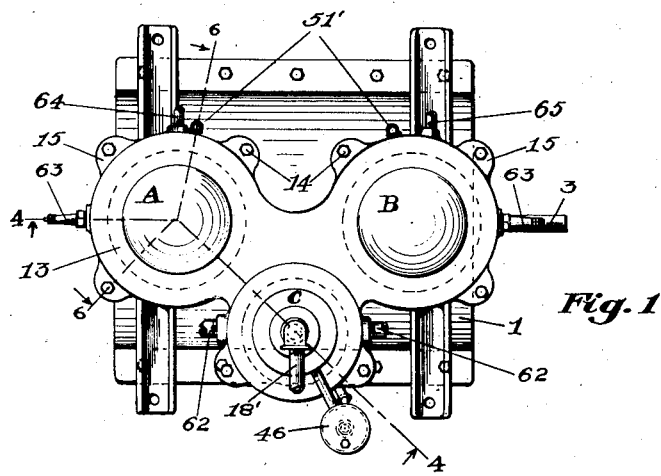
Figs. 1, 2 and 3 represent, respectively, a plan, side elevation and end elevation of my rotary valve engine.
Figures 2, 3:
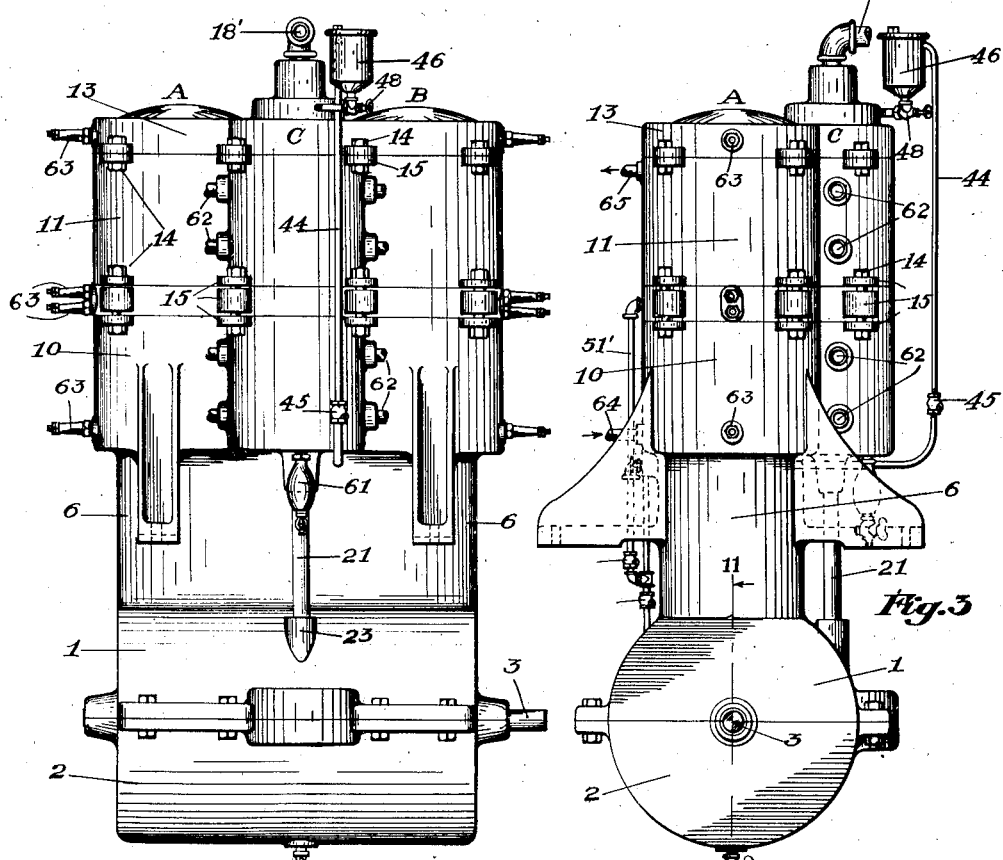

Referring to the drawings, 1 represents the upper portion of the crank-case, 2 the lower portion thereof, 3 the crank-shaft, 4 the cranks and 5 one of the connecting-rods of the engine.

Extending upwardly from the portion 1 are two cylinders 6, 6, each being in vertical alignment with its respective crank 4. Reciprocable in each of these cylinders, 6, is a cross-head 7 with which the connecting-rod 5 makes connection at the wrist-pin 8.

At the top end of one of the cylinders 6, as seen in Fig. 4, is a header 9 and disposed in vertical order thereabove are the two power cylinders 10 and 11 and the interposed header 12. On the top of cylinder 11 is a cover 13 and the whole vertical assembly of cylinders, headers and cover, which, collectively I call cylinder block A, is secured together by means of the bolts 14 operable in the ears 15.

A similar combination of parts, designated as cylinder block B, is placed over the other cylinder 6, providing two multi-cylinder blocks, corresponding parts in both blocks being cast integral.

Located intermediate the two cylinder blocks A and B, and outwardly removed from the longitudinal central line therethrough, is a valve chest C, composed of a lower cylinder 16, an extension 12' of the header 12, a cylinder 17 and the extended portion 13' of the cover 13. Thus arranged, a duplex, multi-cylinder block engine, complete in itself, is provided, functioning to all intents and purposes as an eight cylinder explosive engine.

Disposed within the valve-chest C and having a common axis therewith is a ported gas pipe 18 fixed to the cylinder cover extension 13' by any suitable means, as by the set-screw 19. A pipe 18' connects with the top of the gas pipe and delivers gas thereto from a carburetor (not shown).

Within the annular space between the valve-chest C and the gas pipe 18 and closely but revolubly fitting these two members, is a rotary sleeve valve 20 fixedly secured to the bottom of which is the valve spindle 21. This spindle extends through the bearing 22, into the crank-case members 1 and 2 and is journalled in the bearings therein, 23 and 24. A gear 25 fixed on the spindle engages the gear 26 on the crank-shaft 3 and provides means to rotate the valve 20.

It will be observed that the outside of the valve has contact with the wall of the valve chest and the inside of the valve with the fixed gas pipe 18. Thus there are four engaging surfaces which, taken in connection with the hereinafter to be described oiling system which thoroughly lubricates these parts, provides quite effective non-gas-leaking facilities for the valve assembly.

The direction of flow of the gas or engine combustible is from the interior of the pipe 18 toward the cylinders, but with a construction as just recited there is slight opportunity for gas under pressure in the cylinders to work back through these joints into the gas reservoir in pipe 18 as it must pass two thoroughly lubricated seats before reaching the latter.

Operable within the cylinders 10 and 11 are pistons 27 and 28, respectively, connecting both of which is a piston-rod 29 which passes downwardly through the headers 12 and 9 into the cylinders 6 and terminates in the cross-head 7 to which it is secured.

It will be observed that the two headers 9 and 12 are provided with piston-rod packing 30 and also have facilities for water-cooling by means of the cored chambers 31,—these chambers communicating with the passages 32 within the water-jacket 33, the latter extending completely around the cylinders 10 and 11 and valve-chest C.

Opening out of the sides of the cylinders 10 and 11 in the cylinder block A are ports 34a, 34b, 34c and 34d, and in the gas-pipe 18, in respective alignment with these latter ports, are openings 35a, 35b, 35c and 35d. In corresponding cylinders composing the cylinder block B are similar ports 36a, 36b, 36c, and 36d which are in alignment with openings 37a, 37b, 37c and 37d in the gas-pipe 18. The two sets of aligning ports and openings in the two cylinder blocks diverge at an angle of ninety degrees.

As can readily be seen by observing Fig. 4, the location, vertically, of the cylinder ports 34a—34d and 36a—36d is such that a double explosion chamber is provided for each cylinder element, and that each piston receives, alternately, an explosive impact on each of its sides at the proper firing period.

To more clearly understand the construction of the sleeve valve 20 and how it functions with respect to the cylinder ports, I have shown in Fig. 12 a diagrammatical development of its peripheral surface into a flat plane surface The lines 1—1, 2—2, 3—3 and 4—4 indicate the vertical positions, relative to the valve, of the four cylinder ports in each cylinder block, these ports being at certain times in register with the openings in the sleeve valve. The dotted-line squares shown in Fig. 12 simply represent relative positions of the cylinder ports with respect to the openings of the valve and have nothing to do with the valve structure itself.

They indicate that particular portion of the valve surface which is in register with the cylinder port and the reference characters denote which function the cylinder is exercising at that time,—these characters $e$, $s$, $c$ and $f$ representing, respectively, the four functions of a gas engine,—namely exhaust, suction, compression and firing.

Figure 14:
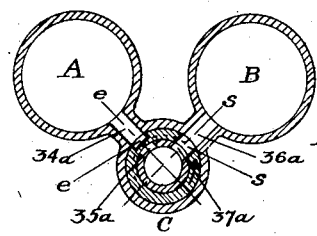
Figs. 14, 15, 16 and 17 show the successive positions of the valve relative to the cylinder ports on each quarter revolution,—the sections being taken through the upper ports of the cylinders on a line coincident with line 8—8, Fig. 4.
Figure 15:
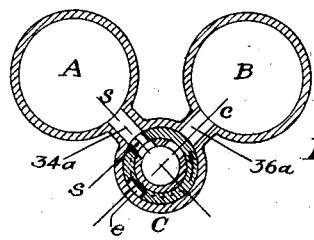
Figure 16:
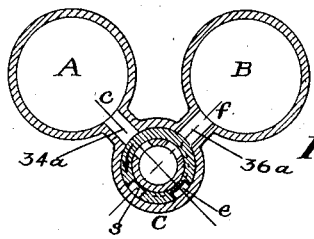

In considering Fig. 12, first note the direction in which the valve rotates (see arrow). The portion marked $e$ on line 1—1 at the upper right-hand corner of the figure represents the cylinder as exhausting through the exhaust passage in the valve and by observing Fig. 14 it will be seen that the cylinder port 34a is open to exhaust, and the cylinder port 36a is drawing in a new charge of gas,—or on suction, $s$, which is 90 degrees in arrears of exhaust. When the valve has rotated forwardly 90 degrees the suction port in the valve will be brought from cylinder block B to cylinder block A, and the exhaust port in the valve will pass away from the cylinder ports,—see Fig. 15. The port in the cylinder block B is now covered by a blank part of the valve, and compression, $c$, is now taking place in that cylinder. On the next quarter turn of the valve both ports in the cylinders are covered, see Fig. 16, block A cylinder is compressing and block B cylinder is firing, $f$.

Figure 17:
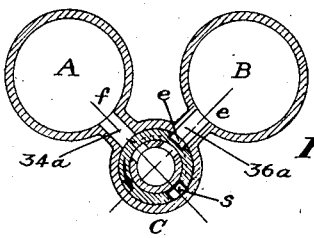

In Fig. 17 the exhaust port of the valve has reached the cylinder in block B which is now exhausting, $e$, and the block A cylinder is at this time firing a charge, $f$.

So by observing the different Figs. 14 to 17 inclusive, taken in connection with Fig. 12 the functioning of the valve can be clearly seen. It must be borne in mind, however, that the Figs. 14 to 17 inclusive show the action of the valve on the upper line of cylinder ports only,—that is, ports 34a and 36a.

But the same action is taking place on all the other line of ports, 34b, c, and d, and 36b, c and d, so far as going through with the regular sequence of operations is concerned; however, it will be noticed by consulting Fig. 12 that the functions of the engine are delayed in their execution in each consecutive line of ports,—those in the upper line preceding those in the line next beneath by one quarter revolution of the valve. For instance, e, in line of ports 1—1 at the upper, right-hand corner of Fig. 12 is located on the vertical line w—w; e, in line 2—2 is on vertical line x—x,—and so on in each line of ports below.

With this arrangement of ports and passages in the valve there is, in each cylinder block, but one execution of each function in every stroke of the pistons,—or, stated in another way, in every one-half revolution of the crank-shaft. Thus the unit valve in my engine controls the e, s, c, and f for eight firing chambers, a duty which would require in the ordinary poppet valve engine sixteen valves to handle.

And while, at the present time, I do not deem it necessary to enlarge on the possibilities of this method of valve actuation, except to refer to it as a quite feasible proposition, I will state that I may elect to broaden the scope of action of my rotary valve by adding two other cylinder blocks with a crank-shaft therefor located in parallel relation to the present one. I would then have four cylinder blocks forming a square, with the unit valve in the center of the square. There would then be four cylinder blocks served by one single valve unit, performing just as efficiently as it now does with the two blocks. The crank-shafts would be connected by gearing or other means and the power taken off at one connection point.

The outside exhaust passages 38A, serving cylinder block A and passage 38B serving cylinder block B carry the exhaust gases from the valve exhaust ports and passages out of the engine. These passages, 38A and 38B, are located either above or below the plane in which are located the cylinder ports 34a, b, c and d, and 36a, b, c and d,—it being necessary to so place them to avoid interference with the cylinder ports.

In Fig. 5 the course of the exhaust or burned gas from the cylinders may be traced. It discharges first through the port 34a, then passes into the vertically disposed passage or depression 39 in the wall of the valve and thence through or around the circumferential passage 40 to the discharge opening 38A. These circumferential depressions 40 extend one-half around the periphery of the valve and are thus made so that communication may be had between the cylinder ports and the exhaust passages 38A and 38B,—these two latter being somewhat removed from the former.

In describing the features and elements of the engine which pertain to the lubrication of the parts thereof I will call attention to the fact that as the cranks of this engine are what are termed opposed cranks, there is never any pressure above that of the atmosphere created in the crank-case.

Extending from the bottom of the crank-case 2 and rising to the top of the cylinder 6 is a pipe 41. On this pipe is a check-valve 42. A needle-valve 43 controls the amount of oil it is desired to pass into the interior of the cylinder 6.

From the upper interior end of cylinder 6 a pipe 44, having thereon a check-valve 45, extends to an oil supply tank 46, from which latter a pipe 47 communicates with the upper interior end of the valve chest C. A needle-valve 48 provides close regulation of the oil supply to the chamber 49 in which there is constantly a sufficient amount to lubricate both sides of the sleeve valve 20. The tank 46 is filled by removing the plug 50.

Branching off from the pipe 41 are pipe lines 51 and 51' which convey oil to the piston rod through the headers 9 and 12, respectively, as illustrated in Fig. 6.

The check-valves 45 and 52 permit oil to pass upwardly therethrough but prevent any returning.

I provide in the upper side of the cross-head 7 a counterbored space 53 and that portion of the piston-rod 29 within this space has transverse holes 54 communicating with a longitudinal hole 55 drilled the whole length of the rod,—the extreme ends of this hole being plugged. Branching off from this hole 55 are holes 56 through the pistons 27 and 28 which latter holes provide lubrication for the cylinder walls. A small ball check-valve 57 is placed near the bottom of the hole 55 to retain the oil therein and prevent its returning to the cylinder 6.

Depending from the cylinder head 9 and surrounding the piston-rod is a sleeve 58 and when the cross-head is in "up" position this sleeve enters the counterbore 53, which it closely fits, as seen in Fig. 7.

The feeding of the oil to the several parts is accomplished by the air pressure created in the cylinder 6 on the upward movement of the cross-head 7.

Assume that the cross-head is in the "up" position as seen in Fig. 7. On its downward stroke a partial vacuum will be formed in the cylinder 6 causing oil to rise in the pipe 41 and a certain amount to pass into the cylinder 6,—the amount depending on the extent of opening of the needle-valve 43. After the cross-head has passed the vent 59, on its downward stroke, the interior of the cylinder 6 will be restored to atmospheric pressure.

On the upward stroke of the cross-head, after again passing the vent 59, the air pressure in the cylinder will rise and produce a corresponding pressure in the tank 46 from which oil will be forced to the valve chest chamber 49.

The air pressure in cylinder 6 will also force the oil remaining in the pipe 41 above the check-valve 42, into pipes 51 and 51' carrying oil to the piston-rod as it passes through headers 9 and 12. And oil, which, on the downward stroke of the cross-head, has been drawn into the cylinder 6 will be forced through the branch holes 54 into the longitudinal hole 55 and passing upwardly will flow through the branch holes 56, through the pistons on to the walls of the working cylinders 10 and 11. The object of the sleeve 56 is to give a more positive, or as it might be termed a "two-stage" pressure on the oil in the hole 55 assuring the passage of a certain amount of oil to the pistons on every upward stroke thereof.

Regulation of the final or extreme possible pressure in the cylinder 6 may be had by the adjustment of the relief valve 60. Accumulation of oil and dirt may be collected in the drain cup 61, from which it may be periodically drawn off.

While the foregoing discloses one method of providing forced-feed lubrication to the several moving elements comprising an internal combustion engine having the characteristics of the one described and illustrated, I am more particularly concerned with the immediate lubrication of my rotary valve sleeve, in the accomplishment of which I preferably employ forced-feeding means of some sort.

The valve being in the form of a cylinder with an open top end surrounding the fixed gas pipe and disposed at the bottom of the oil chamber 49 gives assurance that both the inner and outer surfaces of the valve will be properly lubricated, so long as there is oil in the chamber—particularly oil under pressure. It will be observed that the top end of the wall of the valve is chambered both ways so as to better guide the oil to the two valve surfaces requiring lubrication.

Air raised in pressure by any convenient agent passes through the pipe 44 to the oil supply tank 46 from which the oil discharge is controlled by the valve 48 so that a regulated oil pressure is had in the chamber 49.

The exhaust pipes 62 may be brought together in a common manifold and a single connection led to the muffler (not shown). The spark plugs 63 may be placed in any convenient location around the periphery of the cylinder blocks.

Circulating water for cooling purposes enters the connection at 64 and discharges at connection 65. It will be observed by reference to Fig. 8 that, as shown, the water must pass around the cylinder block A, then completely around the valve chest C and finally around the cylinder block B. This arrangement, however, may be varied to suit conditions.

The pistons are recessed on their tops and bottoms to provide combustion or explosion chamber space, and the cylinder ports are so located that the pistons, at the extreme end of their travel, just close them without overlap of the piston.

This provides not only considerable relief to the sleeve valve at the time of the initial impact of the explosion, but is of great advantage in the matter of more satisfactorily purging the cylinder of burned gas, a larger quantity remaining in the cylinder did the piston pass the port to any considerable extent.

The operation of the engine differs in but few respects from the ordinary type of poppet-valve internal combustion engine. The usual igniter and apparatus connected therewith, carburetor and other necessary accessories all similar. The novelty in construction consists primarily in the one piece valve operating in conjunction with cylinders having but one port which is used for both admission and exhaust.

As is obvious, an engine constructed on these lines may be assembled in a plurality of two-cylinder-block units, of which I have shown and described but one unit; and when two such units are incorporated in the engine it would be the equivalent of a sixteen cylinder engine as usually constructed—and occupy a space, longitudinally, of but slightly more than that required for an ordinary four cylinder type.

Having thus described my invention, what I claim is:—

1. A rotary valve mechanism for internal combustion engines comprising in combination a casing having ports therein so arranged as to provide communication between its interior and the interior of each cylinder in a plurality of multi-cylinder blocks, a fixed gas-inlet pipe concentrically disposed in said casing and spaced therefrom, a plurality of ports in said pipe radially and axially aligning, respectively, with the ports in said casing, a sleeve revolubly mounted interjacent said casing and said fixed gas-inlet pipe, a plurality of gas inlet ports in said sleeve adapted to intermittently register, respectively, with the ports in said gas-inlet pipe and the ports in said casing, a plurality of peripheral exhaust ports and channels cut on the outer periphery of said sleeve, a plurality of discharge openings leading out from the interior of said casing and into register with which said peripheral exhaust channels are adapted to be intermittently brought, and means to lubricate both the inner and the outer surfaces of said sleeve by oil from a supply in common and in which one end of said sleeve is submersed.

2. A rotary valve mechanism adaptable for use with an internal combustion engine which includes a plurality of axially aligning, double acting cylinders having a single gas port opening out of the side of each thereof at both its upper and lower ends, comprising in combination a cylindrical casing disposed adjacent said cylinders and in axial parallelism therewith, the interior of said casing intercommunicating with the interiors of said cylinders through said ports, a fixed gas-inlet pipe concentrically disposed within said casing and spaced therefrom, a plurality of ports through said pipe aligning, respectively, both radially and axially with the ports in said casing, a revoluble sleeve interjacent said casing and said fixed gas-inlet pipe, a plurality of inlet ports in said revoluble sleeve passing through the wall thereof, adapted at predetermined times to register with the respective ports in said casing, a plurality of exhaust ports in, but not perforating the wall of said revoluble sleeve, said exhaust ports adapted, also, to register at predetermined times with the respective ports in said casing, peripheral exhaust channels leading from said exhaust ports and terminating at points radially and axially spaced from said exhaust ports, a plurality of discharge openings leading out of said casing and disposed in axial alignment with the peripheral exhaust channels in said revoluble sleeve, respectively, a spindle on one end of said revoluble sleeve, and means to rotate said spindle.

3. A rotary valve mechanism adapted for use on an internal combustion engine cylinder, comprising in combination a casing arranged on said cylinder in axially parallel relation thereto, two ports providing communication between the interior of said cylinder and the interior of said casing, one of said ports being disposed near the top and the other near the bottom end of said cylinder, a revoluble sleeve operable in said casing, two gas inlet ports in said sleeve perforating the wall thereof and adapted to be brought at predetermined times into register, respectively, with the ports in said casing, two exhaust ports cut partially through the wall of said sleeve and adapted, also, to be intermittently brought into register, respectively, with said casing ports, two channels cut on the outer periphery of said revoluble sleeve and extending, respectively, from said exhaust ports to points both axially and circumferentially removed therefrom, two discharge openings leading from the interior of said casing into register with which said peripheral channels are adapted to be intermittently and respectively brought, a fixed gas inlet pipe disposed within said sleeve, two ports in said pipe adapted to register, respectively, and at predetermined times with the inlet ports in said sleeve, a head adapted to receive and support one end of said fixed gas inlet pipe and to provide therein a chamber into which projects one end of said sleeve, means to rotate said sleeve, and means whereby a supply of lubricant may be constantly available to fill said chamber.

4. A rotary valve mechanism adaptable for use on an internal combustion engine having a plurality of cylinder blocks, each thereof including a plurality of vertical, axially aligning cylinders, comprising in combination a cylindrical casing, with axis vertically disposed, located centrally of said cylinder blocks, a single gas port leading outwardly and laterally from both the upper and the lower interior portions of each of said cylinders, all thereof adapted to provide communication between the interiors of said cylinders and the interior of said casing, two gas discharge openings leading out of said casing and adapted to serve, respectively, the upper and lower portions of each of said cylinders, a fixed gas pipe concentrically mounted in said casing and spaced therefrom, a plurality of inlet gas ports in said fixed gas pipe radially aligning, respectively, with the ports in said cylinders, a sleeve valve, having an open upper end, revolubly disposed interjacent said casing and said fixed gas pipe, a plurality of inlet gas ports in said valve intermittently aligning, respectively, with the ports in said cylinders, a plurality of peripheral exhaust ports in said valve intermittently aligning, respectively, with the ports in said cylinders, a peripheral exhaust channel leading away from each of said peripheral exhaust ports, said channels adapted, respectively, to intermittently align with the gas discharge openings from said casing, a stem on the lower end of said valve, means to rotate said stem and said valve in proper time relation with the operating functions of said engine, a head on said casing, a chamber in said head into which the upper end of said valve projects, means to supply said chamber with a regulated supply of lubricant, and means whereby excess lubricant and foreign matter may be drawn from the lower end of said casing.

In testimony whereof I affix my signature.

ALBERT F. STUART.